US012812712B2

(12) United States Patent
Balan et al.

(10) Patent No.: US 12,812,712 B2
(45) Date of Patent: Nov. 24, 2026

(54) APPARATUS, METHODS, AND COMPUTER PROGRAMS

(71) Applicant: Nokia Solutions and Networks Oy, Espoo (FI)

(72) Inventors: Irina-Mihaela Balan, Munich (DE); Richard Waldhauser, Munich (DE); Stephen Mwanje, Munich (DE)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 380 days.

(21) Appl. No.: 18/552,741

(22) PCT Filed: Feb. 24, 2022

(86) PCT No.: PCT/EP2022/054671

§ 371 (c)(1),
(2) Date: Sep. 27, 2023

(87) PCT Pub. No.: WO2022/207195

PCT Pub. Date: Oct. 6, 2022

(65) Prior Publication Data

US 2024/0172308 A1 May 23, 2024

(30) Foreign Application Priority Data

Apr. 1, 2021 (FI) .................................... 20215402

(51) Int. Cl.
*H04W 76/16* (2018.01)

(52) U.S. Cl.
CPC .................................. *H04W 76/16* (2018.02)

(58) Field of Classification Search
CPC ........... H04W 52/0219; H04W 52/028; H04W 76/16
See application file for complete search history.

(56) References Cited

U.S. PATENT DOCUMENTS 10,212,662 B2 2/2019 Schmidt et al.
2006/0046645 A1* 3/2006 Ogilvie ................ H04W 88/04 455/11.1

(Continued)

FOREIGN PATENT DOCUMENTS

EP 2184939 A1 5/2010
WO 2011/102759 A1 8/2011

(Continued)

OTHER PUBLICATIONS

"3rd Generation Partnership Project; Technical Specification Group Radio Access Network; NG-RAN; NG Application Protocol (NGAP) (Release 16)", 3GPP TS 38.413, V16.1.0, Mar. 2020, pp. 1-341.

(Continued)

*Primary Examiner* — Mansour Oveissi
*Assistant Examiner* — David M Oveissi
(74) *Attorney, Agent, or Firm* — BURR & FORMAN LLP

(57) ABSTRACT

An apparatus for an access point configured to provide a first coverage area, the apparatus comprising: means for determining to deactivate or activate at least part of a second coverage area located within the first coverage area, the second coverage area being provided by a booster cell; means for identifying said booster cell: and means for transmitting a request to said booster cell to deactivate and/or activate the at least part of the second coverage area in dependence on said determination, wherein said request identifies whether the activation and/or deactivation is to be provided at a beam-level or at a cell-level of the second coverage area.

20 Claims, 8 Drawing Sheets

(56) References Cited

U.S. PATENT DOCUMENTS

| | | | | |
|---|---|---|---|---|
| 2014/0170965 | A1 | 6/2014 | Li et al. | |
| 2015/0223135 | A1* | 8/2015 | Ratasuk | H04W 36/20 455/436 |
| 2015/0358895 | A1 | 12/2015 | Cho et al. | |
| 2019/0053193 | A1* | 2/2019 | Park | H04W 74/004 |
| 2022/0264346 | A1* | 8/2022 | Damnjanovic | H04W 24/10 |

FOREIGN PATENT DOCUMENTS

| | | | |
|---|---|---|---|
| WO | 2013/174771 | A1 | 11/2013 |
| WO | 2016/041589 | A1 | 3/2016 |
| WO | 2018/006925 | A1 | 1/2018 |
| WO | 2021/024016 | A1 | 2/2021 |
| WO | 2022/207195 | A1 | 10/2022 |

OTHER PUBLICATIONS

"3rd Generation Partnership Project; Technical Specification Group Radio Access Network; Evolved Universal Terrestrial Radio Access Network (E-UTRAN); S1 Application Protocol (S1AP) (Release 16)", 3GPP TS 36.413, V16.1.0, Mar. 2020, pp. 1-391.

"3rd Generation Partnership Project; Technical Specification Group Radio Access Network; Study on RAN-centric data collection and utilization for LTE and NR (Release 16)", 3GPP TR 37.816, V16.0.0, Jul. 2019, pp. 1-35.

"3rd Generation Partnership Project; Technical Specification Group Radio Access Network; NR; Medium Access Control (MAC) protocol specification (Release 15)", 3GPP TS 38.321, V15.3.0, Sep. 2018, pp. 1-76.

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

Office action received for corresponding Finnish Patent Application No. 20215402, dated Sep. 29, 2021, 9 pages.

Office action received for corresponding Finnish Patent Application No. 20215402, dated Mar. 9, 2022, 7 pages.

International Search Report and Written Opinion received for corresponding Patent Cooperation Treaty Application No. PCT/EP2022/054671, dated Jun. 10, 2022, 10 pages.

* cited by examiner

APPARATUS, METHODS, AND COMPUTER PROGRAMS

RELATED APPLICATION

This application claims priority to PCT Application No. PCT/EP2022/054671, filed on Feb. 24, 2022, which claims priority to FI application No. 20215402, filed on Apr. 1, 2021, each of which is incorporated herein by reference in its entirety.

FIELD

The present disclosure relates to apparatus, methods, and computer programs, and in particular but not exclusively to apparatus, methods and computer programs for network apparatuses.

BACKGROUND

A communication system can be seen as a facility that enables communication sessions between two or more entities such as user terminals, access nodes and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known is the long-term evolution (LTE) or the Universal Mobile Telecommunications System (UMTS) radio-access technology. Another example communication system is so called 5G system that allows user equipment (UE) or user device to contact a 5G core via e.g. new radio (NR) access technology or via other access technology such as Untrusted access to 5GC or wireline access technology.

SUMMARY

According to a first aspect, there is provided an apparatus for an access point configured to provide a first coverage area, the apparatus comprising: means for determining to deactivate or activate at least part of a second coverage area located within the first coverage area, the second coverage area being provided by a booster cell; means for identifying said booster cell; and means for transmitting a request to said booster cell to deactivate and/or activate the at least part of the second coverage area in dependence on said determination, wherein said request identifies whether the activation and/or deactivation is to be provided at a beam-level or at a cell-level of the second coverage area.

The first coverage area may be provided using a different communication protocol to the communication protocol used to provide the second coverage area.

The access point may be a Long Term Evolution access point and the at least one booster cell may be a New Radio access point.

Said means for identifying said at least one booster cell may comprise: means for retrieving a cell booster table from a table host, said cell booster table associating a plurality of coverage areas located in the first coverage area with respective booster cells; and means for identifying said at least one booster cell using the cell booster table.

The determining to deactivate or activate at least part of a second coverage area may be performed in dependence on a plurality of communication parameters for a user equipment located in said second coverage area, the plurality of communication parameters for a user equipment comprising at least two of: user equipment capability information associated with the user equipment; slice information for at least one service being provided to or requested by the user equipment; mobility information of said user equipment; Key Performance Indicators on at least one communication performed by said user equipment in the first coverage area; and on at least one communication performed by said user equipment in the first coverage area.

The means for determining to deactivate or activate a second coverage area located within the first coverage area may depend on a load on the access point and/or a load on neighbouring access points.

The apparatus may comprise means for receiving from said booster cell an indication that different beams will be activated and/or deactivated relative to beams identified in the transmitted request; means for determining to deactivate or activate a different part of the second coverage area located within the first coverage area to the at least part of the second coverage area; and means for transmitting a request to said booster cell to deactivate and/or activate the different part of the second coverage area.

The apparatus may comprise means for maintaining at least one list of booster cells, the at least one list comprising: a list of booster cells that are active in the first coverage area, a list of booster cells that must remain active in the first coverage area, and/or a list of booster cells that need to be activated given predefined respective criteria.

According to a second aspect, there is provided an apparatus for an access point, the apparatus comprising: means for, while the access point is located in a first coverage area, receiving a first request to activate and/or deactivate at least part of a second coverage area provided by the access point, wherein said request identifies whether the activation and/or deactivation is to be provided at a beam-level or at a cell-level of the second coverage area; and means for responding to the first request with an indication of said at least part of the second coverage area that will be activated and/or deactivated.

The first coverage area may be provided using a different communication protocol to the communication protocol used to provide the second coverage area.

The access point may be a Long Term Evolution access point and the at least one booster cell may be a New Radio access point.

Said indication may indicate different beams that will be activated and/or deactivated relative to beams identified in the received request.

The apparatus may comprise means for receiving a second request to activate and/or deactivate a different part of the second coverage area relative to the at least part of the second coverage area.

According to a third aspect, there is provided an apparatus for a network apparatus, the apparatus comprising: means for maintaining a cell booster table, said cell booster table associating a plurality of coverage areas located in a first coverage area with respective booster cells, wherein the first coverage area is provided by a first access point; and means for receiving a request for cell booster table from the first access point; and means for providing the cell booster table to the first access point in response to said request.

The apparatus may comprise means for maintaining at least one list of booster cells, the at least one list comprising: a list of booster cells that are active in the first coverage area, a list of booster cells that must remain active in the first coverage area, and/or a list of booster cells that need to be activated given predefined respective criteria.

According to a fourth aspect, there is provided an apparatus for an access point configured to provide a first coverage area, the apparatus comprising: at least one processor; and at least one memory comprising code that, when executed by the at least one processor, causes the apparatus to: determine to deactivate or activate at least part of a second coverage area located within the first coverage area, the second coverage area being provided by a booster cell; identify said booster cell; and transmit a request to said booster cell to deactivate and/or activate the at least part of the second coverage area in dependence on said determination, wherein said request identifies whether the activation and/or deactivation is to be provided at a beam-level or at a cell-level of the second coverage area.

The first coverage area may be provided using a different communication protocol to the communication protocol used to provide the second coverage area.

The access point may be a Long Term Evolution access point and the at least one booster cell may be a New Radio access point.

Said identifying said at least one booster cell may comprise: retrieving a cell booster table from a table host, said cell booster table associating a plurality of coverage areas located in the first coverage area with respective booster cells; and identifying said at least one booster cell using the cell booster table.

The determining to deactivate or activate at least part of a second coverage area may be performed in dependence on a plurality of communication parameters for a user equipment located in said second coverage area, the plurality of communication parameters for a user equipment comprising at least two of: user equipment capability information associated with the user equipment; slice information for at least one service being provided to or requested by the user equipment; mobility information of said user equipment; Key Performance Indicators on at least one communication performed by said user equipment in the first coverage area; and on at least one communication performed by said user equipment in the first coverage area.

The determining to deactivate or activate a second coverage area located within the first coverage area may depend on a load on the access point and/or a load on neighbouring access points.

The apparatus may be caused to receive from said booster cell an indication that different beams will be activated and/or deactivated relative to beams identified in the transmitted request; determine to deactivate or activate a different part of the second coverage area located within the first coverage area to the at least part of the second coverage area; and transmit a request to said booster cell to deactivate and/or activate the different part of the second coverage area.

The apparatus may be caused to maintain at least one list of booster cells, the at least one list comprising: a list of booster cells that are active in the first coverage area, a list of booster cells that must remain active in the first coverage area, and/or a list of booster cells that need to be activated given predefined respective criteria.

According to a fifth aspect, there is provided an apparatus for an access point, the apparatus comprising: at least one processor; and at least one memory comprising code that, when executed by the at least one processor, causes the apparatus to: while the access point is located in a first coverage area, receive a first request to activate and/or deactivate at least part of a second coverage area provided by the access point, wherein said request identifies whether the activation and/or deactivation is to be provided at a beam-level or at a cell-level of the second coverage area; and respond to the first request with an indication of said at least part of the second coverage area that will be activated and/or deactivated.

The first coverage area may be provided using a different communication protocol to the communication protocol used to provide the second coverage area.

The access point may be a Long Term Evolution access point and the at least one booster cell may be a New Radio access point.

Said indication may indicate different beams that will be activated and/or deactivated relative to beams identified in the received request.

The apparatus may be caused to receive a second request to activate and/or deactivate a different part of the second coverage area relative to the at least part of the second coverage area.

According to a sixth aspect, there is provided an apparatus for a network apparatus, the apparatus comprising: at least one processor; and at least one memory comprising code that, when executed by the at least one processor, causes the apparatus to: maintain a cell booster table, said cell booster table associating a plurality of coverage areas located in a first coverage area with respective booster cells, wherein the first coverage area is provided by a first access point; and receive a request for cell booster table from the first access point; and provide the cell booster table to the first access point in response to said request.

The apparatus may be caused to maintain at least one list of booster cells, the at least one list comprising: a list of booster cells that are active in the first coverage area, a list of booster cells that must remain active in the first coverage area, and/or a list of booster cells that need to be activated given predefined respective criteria.

According to a seventh aspect, there is provided a method for an apparatus for an access point configured to provide a first coverage area, the method comprising: determining to deactivate or activate at least part of a second coverage area located within the first coverage area, the second coverage area being provided by a booster cell; identifying said booster cell; and transmitting a request to said booster cell to deactivate and/or activate the at least part of the second coverage area in dependence on said determination, wherein said request identifies whether the activation and/or deactivation is to be provided at a beam-level or at a cell-level of the second coverage area.

The first coverage area may be provided using a different communication protocol to the communication protocol used to provide the second coverage area.

The access point may be a Long Term Evolution access point and the at least one booster cell may be a New Radio access point.

Said identifying said at least one booster cell may comprise: retrieving a cell booster table from a table host, said cell booster table associating a plurality of coverage areas located in the first coverage area with respective booster cells; and identifying said at least one booster cell using the cell booster table.

The determining to deactivate or activate at least part of a second coverage area may be performed in dependence on a plurality of communication parameters for a user equipment located in said second coverage area, the plurality of communication parameters for a user equipment comprising at least two of: user equipment capability information associated with the user equipment; slice information for at least one service being provided to or requested by the user equipment; mobility information of said user equipment; Key Performance Indicators on at least one communication performed by said user equipment in the first coverage area; and on at least one communication performed by said user equipment in the first coverage area.

The determining to deactivate or activate a second coverage area located within the first coverage area may depend on a load on the access point and/or a load on neighbouring access points.

The method may comprise receiving from said booster cell an indication that different beams will be activated and/or deactivated relative to beams identified in the transmitted request; determining to deactivate or activate a different part of the second coverage area located within the first coverage area to the at least part of the second coverage area; and transmitting a request to said booster cell to deactivate and/or activate the different part of the second coverage area.

The method may comprise maintaining at least one list of booster cells, the at least one list comprising: a list of booster cells that are active in the first coverage area, a list of booster cells that must remain active in the first coverage area, and/or a list of booster cells that need to be activated given predefined respective criteria.

According to an eighth aspect, there is provided a method for an apparatus for an access point, the method comprising: while the access point is located in a first coverage area, receiving a first request to activate and/or deactivate at least part of a second coverage area provided by the access point, wherein said request identifies whether the activation and/or deactivation is to be provided at a beam-level or at a cell-level of the second coverage area; and responding to the first request with an indication of said at least part of the second coverage area that will be activated and/or deactivated.

The first coverage area may be provided using a different communication protocol to the communication protocol used to provide the second coverage area.

The access point may be a Long Term Evolution access point and the at least one booster cell may be a New Radio access point.

Said indication may indicate different beams that will be activated and/or deactivated relative to beams identified in the received request.

The method may comprise receiving a second request to activate and/or deactivate a different part of the second coverage area relative to the at least part of the second coverage area.

According to a ninth aspect, there is provided a method for an apparatus for a network apparatus, the method comprising: maintaining a cell booster table, said cell booster table associating a plurality of coverage areas located in a first coverage area with respective booster cells, wherein the first coverage area is provided by a first access point; receiving a request for cell booster table from the first access point; and providing the cell booster table to the first access point in response to said request.

The method may comprise maintaining at least one list of booster cells, the at least one list comprising: a list of booster cells that are active in the first coverage area, a list of booster cells that must remain active in the first coverage area, and/or a list of booster cells that need to be activated given predefined respective criteria.

According to a tenth aspect, there is provided an apparatus for an access point configured to provide a first coverage area, the apparatus comprising: determining circuitry for determining to deactivate or activate at least part of a second coverage area located within the first coverage area, the second coverage area being provided by a booster cell; identifying circuitry for identifying said booster cell; and transmitting circuitry for transmitting a request to said booster cell to deactivate and/or activate the at least part of the second coverage area in dependence on said determination, wherein said request identifies whether the activation and/or deactivation is to be provided at a beam-level or at a cell-level of the second coverage area.

The first coverage area may be provided using a different communication protocol to the communication protocol used to provide the second coverage area.

The access point may be a Long Term Evolution access point and the at least one booster cell may be a New Radio access point.

Said identifying circuitry may comprise: retrieving circuitry for retrieving a cell booster table from a table host, said cell booster table associating a plurality of coverage areas located in the first coverage area with respective booster cells; and identifying circuitry for identifying said at least one booster cell using the cell booster table.

The determining circuitry for determining to deactivate or activate at least part of a second coverage area may perform said determining in dependence on a plurality of communication parameters for a user equipment located in said second coverage area, the plurality of communication parameters for a user equipment comprising at least two of: user equipment capability information associated with the user equipment; slice information for at least one service being provided to or requested by the user equipment; mobility information of said user equipment; Key Performance Indicators on at least one communication performed by said user equipment in the first coverage area; and on at least one communication performed by said user equipment in the first coverage area.

The determining circuitry for determining to deactivate or activate a second coverage area located within the first coverage area may depend on a load on the access point and/or a load on neighbouring access points.

The apparatus may comprise receiving circuitry for receiving from said booster cell an indication that different beams will be activated and/or deactivated relative to beams identified in the transmitted request; determining circuitry for determining to deactivate or activate a different part of the second coverage area located within the first coverage area to the at least part of the second coverage area; and transmitting circuitry for transmitting a request to said booster cell to deactivate and/or activate the different part of the second coverage area.

The apparatus may comprise maintaining circuitry for maintaining at least one list of booster cells, the at least one list comprising: a list of booster cells that are active in the first coverage area, a list of booster cells that must remain active in the first coverage area, and/or a list of booster cells that need to be activated given predefined respective criteria.

According to an eleventh aspect, there is provided an apparatus for an access point, the apparatus comprising: receiving circuitry for, while the access point is located in a first coverage area, receiving a first request to activate and/or deactivate at least part of a second coverage area provided by the access point, wherein said request identifies whether the activation and/or deactivation is to be provided at a beam-level or at a cell-level of the second coverage area; and responding circuitry for responding to the first request with an indication of said at least part of the second coverage area that will be activated and/or deactivated.

The first coverage area may be provided using a different communication protocol to the communication protocol used to provide the second coverage area.

The access point may be a Long Term Evolution access point and the at least one booster cell may be a New Radio access point.

Said indication may indicate different beams that will be activated and/or deactivated relative to beams identified in the received request.

The apparatus may comprise receiving circuitry for receiving a second request to activate and/or deactivate a different part of the second coverage area relative to the at least part of the second coverage area.

According to a twelfth aspect, there is provided an apparatus for a network apparatus, the apparatus comprising: maintaining circuitry for maintaining a cell booster table, said cell booster table associating a plurality of coverage areas located in a first coverage area with respective booster cells, wherein the first coverage area is provided by a first access point; receiving circuitry for receiving a request for cell booster table from the first access point; and providing circuitry for providing the cell booster table to the first access point in response to said request.

The apparatus may comprise maintaining for maintaining at least one list of booster cells, the at least one list comprising: a list of booster cells that are active in the first coverage area, a list of booster cells that must remain active in the first coverage area, and/or a list of booster cells that need to be activated given predefined respective criteria.

According to a thirteenth aspect, there is provided non-transitory computer readable medium comprising program instructions for causing an apparatus for an access point configured to provide a first coverage area to perform at least the following: determine to deactivate or activate at least part of a second coverage area located within the first coverage area, the second coverage area being provided by a booster cell; identify said booster cell; and transmit a request to said booster cell to deactivate and/or activate the at least part of the second coverage area in dependence on said determination, wherein said request identifies whether the activation and/or deactivation is to be provided at a beam-level or at a cell-level of the second coverage area.

The first coverage area may be provided using a different communication protocol to the communication protocol used to provide the second coverage area.

The access point may be a Long Term Evolution access point and the at least one booster cell may be a New Radio access point.

Said identifying said at least one booster cell may comprise: retrieving a cell booster table from a table host, said cell booster table associating a plurality of coverage areas located in the first coverage area with respective booster cells; and identifying said at least one booster cell using the cell booster table.

The determining to deactivate or activate at least part of a second coverage area may be performed in dependence on a plurality of communication parameters for a user equipment located in said second coverage area, the plurality of communication parameters for a user equipment comprising at least two of: user equipment capability information associated with the user equipment; slice information for at least one service being provided to or requested by the user equipment; mobility information of said user equipment; Key Performance Indicators on at least one communication performed by said user equipment in the first coverage area; and on at least one communication performed by said user equipment in the first coverage area.

The determining to deactivate or activate a second coverage area located within the first coverage area may depend on a load on the access point and/or a load on neighbouring access points.

The apparatus may be caused to receive from said booster cell an indication that different beams will be activated and/or deactivated relative to beams identified in the transmitted request; determine to deactivate or activate a different part of the second coverage area located within the first coverage area to the at least part of the second coverage area; and transmit a request to said booster cell to deactivate and/or activate the different part of the second coverage area.

The apparatus may be caused to maintain at least one list of booster cells, the at least one list comprising: a list of booster cells that are active in the first coverage area, a list of booster cells that must remain active in the first coverage area, and/or a list of booster cells that need to be activated given predefined respective criteria.

According to a fourteenth aspect, there is provided non-transitory computer readable medium comprising program instructions for causing an apparatus for an access point to perform at least the following: while the access point is located in a first coverage area, receive a first request to activate and/or deactivate at least part of a second coverage area provided by the access point, wherein said request identifies whether the activation and/or deactivation is to be provided at a beam-level or at a cell-level of the second coverage area; and respond to the first request with an indication of said at least part of the second coverage area that will be activated and/or deactivated.

The first coverage area may be provided using a different communication protocol to the communication protocol used to provide the second coverage area.

The access point may be a Long Term Evolution access point and the at least one booster cell may be a New Radio access point.

Said indication may indicate different beams that will be activated and/or deactivated relative to beams identified in the received request.

The apparatus may be caused to receive a second request to activate and/or deactivate a different part of the second coverage area relative to the at least part of the second coverage area.

According to a fifteenth aspect, there is provided non-transitory computer readable medium comprising program instructions for causing an apparatus for a network apparatus to perform at least the following: maintain a cell booster table, said cell booster table associating a plurality of coverage areas located in a first coverage area with respective booster cells, wherein the first coverage area is provided by a first access point; and receive a request for cell booster table from the first access point; and provide the cell booster table to the first access point in response to said request.

The apparatus may be caused to maintain at least one list of booster cells, the at least one list comprising: a list of booster cells that are active in the first coverage area, a list of booster cells that must remain active in the first coverage area, and/or a list of booster cells that need to be activated given predefined respective criteria.

According to a sixteenth aspect, there is provided a computer program comprising program instructions for causing a computer to perform any method as described above.

According to a seventeenth aspect, there is provided a computer program product stored on a medium that may cause an apparatus to perform any method as described herein.

According to an eighteenth aspect, there is provided an electronic device that may comprise apparatus as described herein.

According to a nineteenth aspect, there is provided a chipset that may comprise an apparatus as described herein.

BRIEF DESCRIPTION OF FIGURES

Examples will now be described, by way of example only, with reference to the accompanying Figures in which.

DETAILED DESCRIPTION

In the following, certain aspects are explained with reference to mobile communication devices capable of communication via a wireless cellular system and mobile communication systems serving such mobile communication devices. For brevity and clarity, the following describes such aspects with reference to a 5G wireless communication system. However, it is understood that such aspects are not limited to 5G wireless communication systems, and may, for example, be applied to other wireless communication systems with analogous components (for example, current 6G proposals).

Before explaining in detail the exemplifying embodiments, certain general principles of a 5G wireless communication system are briefly explained with reference to FIG. 1. Such a 5G system is generally considered in terms of a New Radio (NR) part (relating to the interface between a terminal accessing the communication network and a Radio Access Network (RAN) part of the network), and a core network part of the 5G system.

Figure 1:
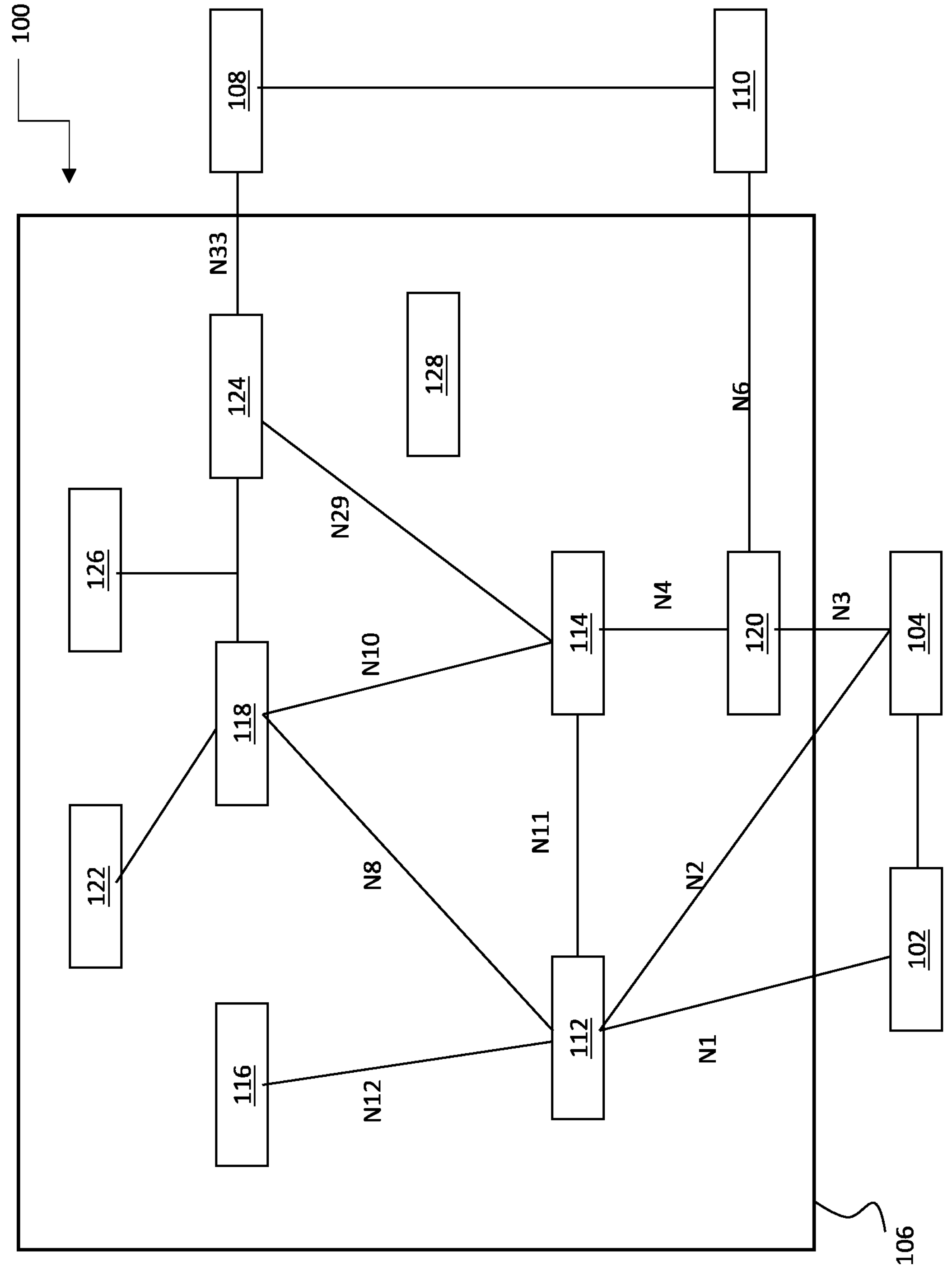
FIG. 1 shows a schematic representation of a 5G system.

FIG. 1 shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes.

The 5GC 106 may comprise one or more Access Management Functions (AMF) 112, one or more Session Management Functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

3GPP refers to a group of organizations that develop and release different standardized communication protocols. They are currently developing and publishing documents related to Release 16, relating to 5G technology, with Release 17 currently being scheduled for 2022.

Figure 5:
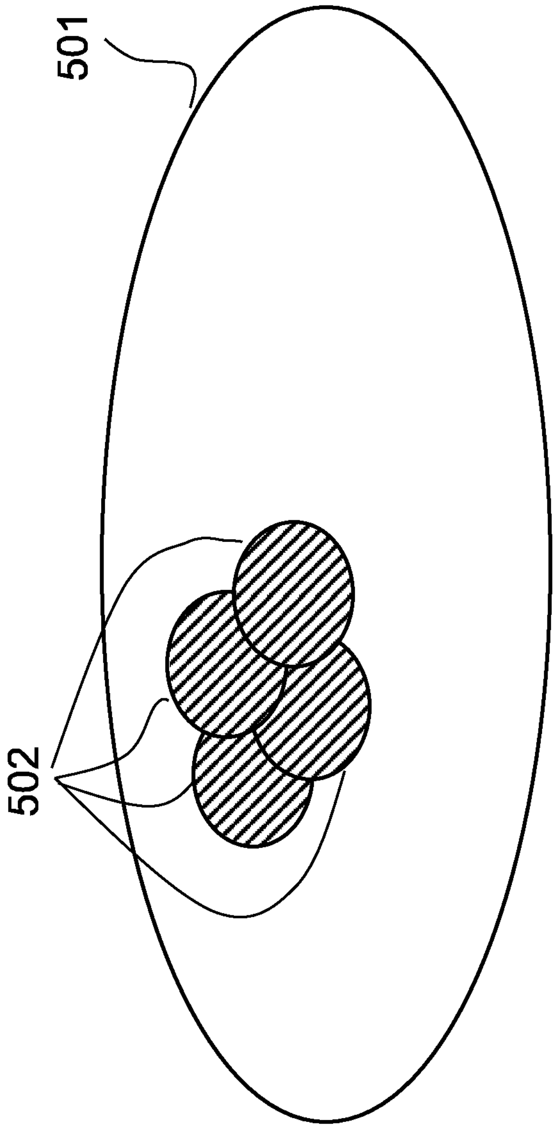
FIG. 5 is a schematic representation of booster cells in a first coverage area.

Under present proposals, smaller NR cells may overlap with coverage provided by much larger cells. This is shown in FIG. 5, in which coverage 501 provided by an LTE cell layer is overlapped with coverage 502 provided by a plurality of NR cells. The LTE layer provides basic coverage, while the NR cells provide capacity boost. This scenario is also considered by the Study on Radio Access Network (RAN)-centric data collection and utilization for LTE and NR (TR 37.816, section 5.8) and is referred to as scenario 1*a*.

In order to achieve energy saving, these NR capacity booster cells may autonomously switch-off their transmission based on their own cell load. This was described in 3GPP Rel-15. Once a capacity booster cell (e.g. the NR cell supporting an LTE coverage cell) autonomously decides when to activate or de-activate itself, then the NG-RAN node owning the concerned cell indicates the switch-on/off action to the e/gNBs over a Next Generation interface and/or over an S1 interface (which is an interface between eNodeBs and the Enhanced Packet Core: specifically, the Mobility Management Entity and the Serving Gateway).

Then, 3GPP Rel-16 supported the case where the eNB owning the cell that provides basic coverage may request the capacity booster NR cell to re-activate based on the coverage cell's own load information or its neighbor cell load information. The eNB requests the NR cell re-activation over the S1 interface and NG interface. Essentially, if load in the LTE cell increases and LTE cell determines that extra capacity is required, the LTE cell determines the most appropriate NR cell to be activated and signal the NR cell to switch on. Deactivation of the NR cell was, however, solely dependent on the NR cell itself. So even if the load in LTE reduces to the level that LTE can take on the load in the NR cell, the LTE cell cannot trigger the NR cell to deactivate. The current standard (3GPP TR 37.816) has documented support for the case where the LTE cell can trigger the switched-off NR cell to switch back on based on the load in the LTE cell or its neighbors.

As an alternative, the switch-on decision may also be taken by Operations, Administration and Management function.

The inventors have realized that there may be cases where it would be useful, for the LTE cell to activate or deactivate an NR cell based on other requirements, including UE mobility, fulfilling certain service requirements or serving particular slices (a network slice is an independent end-to-end logical network that runs on a shared physical infrastructure, capable of providing a negotiated service quality). These cases are not currently covered, yet they could greatly improve service performance while optimizing energy efficiency. For example, UEs entering the LTE coverage area may need NR services for a particular area and duration of time. The LTE cell should be able to identify the appropriate NR cells to be activated in order to meet these requirements. Deactivation when the conditions change would also be useful.

It would also be useful to control the activation and deactivation of the NR resources at the right level of granularity. Standardization only supports the case where the entire NR cell is turned off/on, regardless of whether the cell supports beamforming or not. However, if the NR cell is using beamformed access, the granularity of the action may also be performed at the beam level. This would allow only the needed beams to remain active thereby further improving energy efficiency.

The following proposes a mechanism for allowing a coverage cell (e.g. an LTE cell) to request or trigger the activation and deactivation of a capacity booster cell (e.g. a NR cell) based on a multiplicity of requirements of the connected users. These requirements may include, for example, slice ID, mobility, location, service requirements, etc. The activation and deactivation may be performed on a cell or beam level, if available. The booster cell coverage can be used as standalone (as single connectivity) or as a secondary leg of E-UTRAN New Radio dual connectivity schemes.

The desired NR coverage will thus be dynamic in nature due to UE mobility, service profiles and load levels changing during operation. The determination of the minimum NR coverage needed to support the user services may be aided by a table that correlates NR coverage with UE location. The table may be dynamically updated and/or generated using at least one machine learning algorithm.

Such a described system may help provide an optimal balance between providing a requested Quality of Service for users, while also minimizing the energy usage of the booster cell layer.

The following provides illustrative examples for highlighting features of the presently described system, with reference to the Figures.

Figure 6:
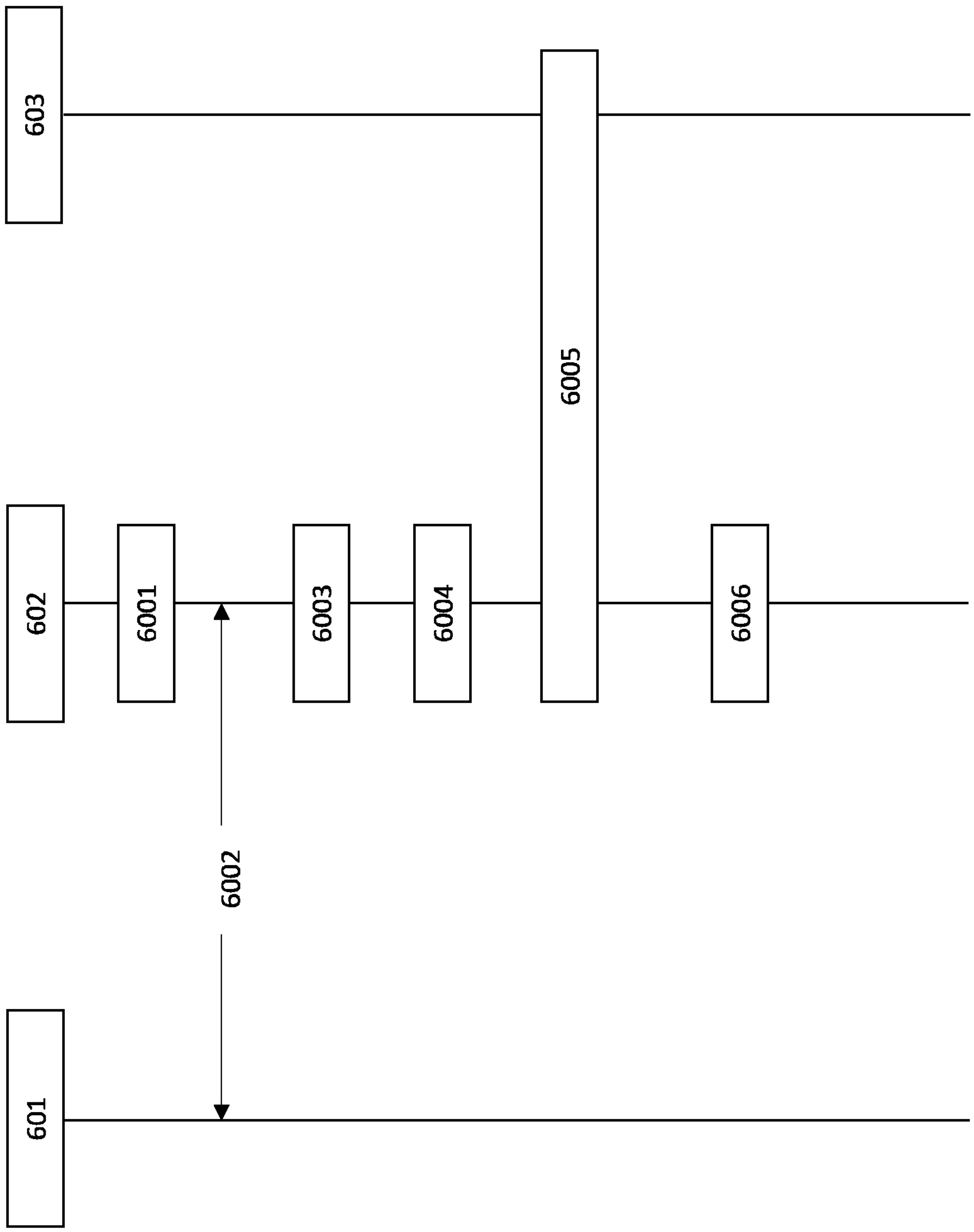
FIG. 6 is an example signalling diagram.

FIG. 6 is a flow chart illustrating potential operations that may be performed by each of a coverage table host 601, a coverage cell 602 and a capacity booster cell 603 located within the coverage cell 602 (as per FIG. 5).

At 6001, the coverage cell 602 determines whether or not it needs extra coverage within its coverage area from a booster cell. When this is determined in the negative, the coverage cell continues to repeat the determination of 6001 until it is determined in the affirmative.

This determination of the booster cell coverage may be carried out periodically and/or or in an ad hoc manner. When the determination is carried out periodically, this may be correlated with the UE mobility pattern and/or state. Ad hoc determinations may be performed in response to an event occurring, such as a UE session and/or Data Radio Bearer starting and/or ending and/or being setup, and/or in response to UE movement.

The coverage cell may assess factors in multiple aspects in making this determination.

For example, the coverage cell 602 may determine its load and/or the load of neighbouring cells in its. When the current load can be carried by the coverage cell alone or shifted over to its neighbors, the booster cells may be switched off to save energy. To this end, measurements and/or Key Performance Indicators available in the coverage cell 602 can be used to determine the load. Examples include Composite Available Group (including Composite Available Capacity, Radio Resource Status, Transport Network Layer Capacity Indicator, Hardware Capacity Indicator), Number of Radio Resource Control Connections, Number of active UEs (i.e. number of UEs having user plane traffic).

As another example, the coverage cell 602 may determine the profiles and conditions of the users in its coverage. This may include, for example, the mobility of the UEs in the coverage, and/or the radio access technology capabilities of the UEs in the coverage (as certain UEs may not support NR or could only support NR which in turn will mean either that no booster cells are needed at all or that a minimum continuous NR coverage needs to be provided). Such information can be extracted from the UE capabilities information element (currently labelled as in UECapabilityInformation in 3GPP specifications), received from the UE or from the Access and Mobility Function in the communication network.

As another example, the coverage cell may determine the service requirements of its connected users. This may including the slices to which the users may be or need to be connected to, as certain services or slices may have requirements that can only be fulfilled by New Radio. Such information is available in the RRCSetupComplete message sent according to current 3GPP specifications, although it is understood that this information may be obtained from other messages depending on how the specifications evolve. For example, the 'Index to Radio Access Technology/Frequency Selection Priority' (a.k.a. the RFSP Index), which is comprised in the UE context and received as part of the Handover Request message, can be used as set by the core network by taking into account the Subscribed Single Network Slice Selection Assistance Information.

The possible presence of booster cell coverage (especially in cases where all booster cells are off) can be advertised to the UEs via broadcast message.

At 6002, the coverage cell 602 obtains a coverage table from the coverage table host 601.

The coverage table may indicate which combination of beams and/or cells deliver a certain type of coverage for a particular location.

In the present example, the NR coverage table is a machine learning-enabled structure that may be constructed and maintained by the node providing the cell coverage. The exact algorithm behind the construction of this table depends on what factors are being considered in a specific network implementation, and its exact form does not have any impact on the presently disclosed techniques.

The NR coverage table may target the minimization of booster cell overlap and ensure that each UE should see at least one beam with a decent quality (e.g. over a certain threshold). An example of such a table is Table 1, below.

TABLE 1

| Potential fields in the coverage table | | | |
|---|---|---|---|
| Location in coverage cell | Pixel Number | Required NR cell | Required NR beam |
| [Lat, Long] | Pixel ID | (1.. maxBoosterCells) OF NR-CGI | Per NR-CGI list OF (1...maxNumber BeamID) |

The machine learning algorithm for computing the table may use, as at least one input, past UE measurements (such as, for example, UE cell and beam level measurements of capacity booster cells and larger coverage cells), and correlate that input with UE location information. The UE location information may be provided, for example, using Global Positioning System (GPS), and/or sensor data and/or fingerprinting, which is a mechanism for geolocation that uses browser information to identify a physical location of a user/UE. The coverage cell area may be divided into pixels and each is assigned a number. The location in the NR coverage table may thus be represented using GPS coordinates and/or to a pixel ID. Users' location may be assigned to pixels based on fingerprinting algorithms, where the exact form of the fingerprinting algorithm does not have any impact of the presently disclosed techniques.

At 6003, the coverage cell 602 obtains location(s) for at least one UE within its coverage area using the coverage table. In essence, this step helps to determine where coverage of booster cells may need to be changed within the coverage cell 602, while the earlier determination determines that at least one booster cell coverage is to be changed.

The contents of the NR coverage table may be cross-correlated with the current position of the UEs and their service requirements and capabilities.

At 6004, the coverage cell uses the received coverage table to compute the capacity booster cells that are needed to provide the coverage determined in 6001.

In response to the computation, the coverage cell 602 may send a request or an instruction to the capacity booster cell 603 at 6005 (in addition to any other capacity booster cells that the coverage cell 602 computes as part of 6004 as needing to change at least part of their coverage). For clarity throughout, the following will use the term "request" to also include examples in which an instruction mandating a change is sent.

The request may indicate to the capacity booster cell 603 to a) remain fully active; b) become fully inactive; c) retain specified beams only; and d) activate specified beams only. More specific examples on this are provided below. It is understood that the coverage cell 602 may request different actions from different capacity booster cells.

As the first example, the coverage cell 602 may request the capacity booster cell 603 to stay active even when the capacity booster cell's energy saving conditions for deactivation are fulfilled.

As the second example, the coverage cell 602 informs the capacity booster cell that the boost is no longer needed. This may be for, for example, capacity reasons and/or for other service-related reasons. For example, the coverage cell 602 may inform the capacity booster cell with the indication to deactivate when the coverage cell's load has reduced to the level where it can comfortably carry the booster cell's load and if there are no users with special requirements that are being served by either the coverage cell or the booster cell.

As the third example, the coverage cell 602 may request that specific beams of the capacity booster cell 603 remain active. This may be, for example, when the capacity booster cell 603 would preferentially deactivate resources for energy saving efficiency, but it would also be useful to the coverage cell 602 for at least partial coverage to be maintained. Following such a request, the capacity booster cell may only deactivate the unrequired beams, while leaving the signalled beams as active. Relatedly the coverage cell may request for specific beams of the capacity booster cell to be activated when needed or to be deactivated when those specific beams are no longer of interest.

The capacity booster cell 603 may perform the requested action. When at least one of the capacity booster cells 603 declines the proposed action by the coverage cell 602, the coverage cell computes a new combination of cells/beams can be computed and signaled.

At 6006, the coverage cell 602 updates its list of active cells and beams. This information may be provided back to the coverage table host 601 for updating the coverage table contents. The coverage cell may track the list of NR cells that have been actuated, that must remain on, and/or that need to be activated based on the different requirements.

Figure 7:
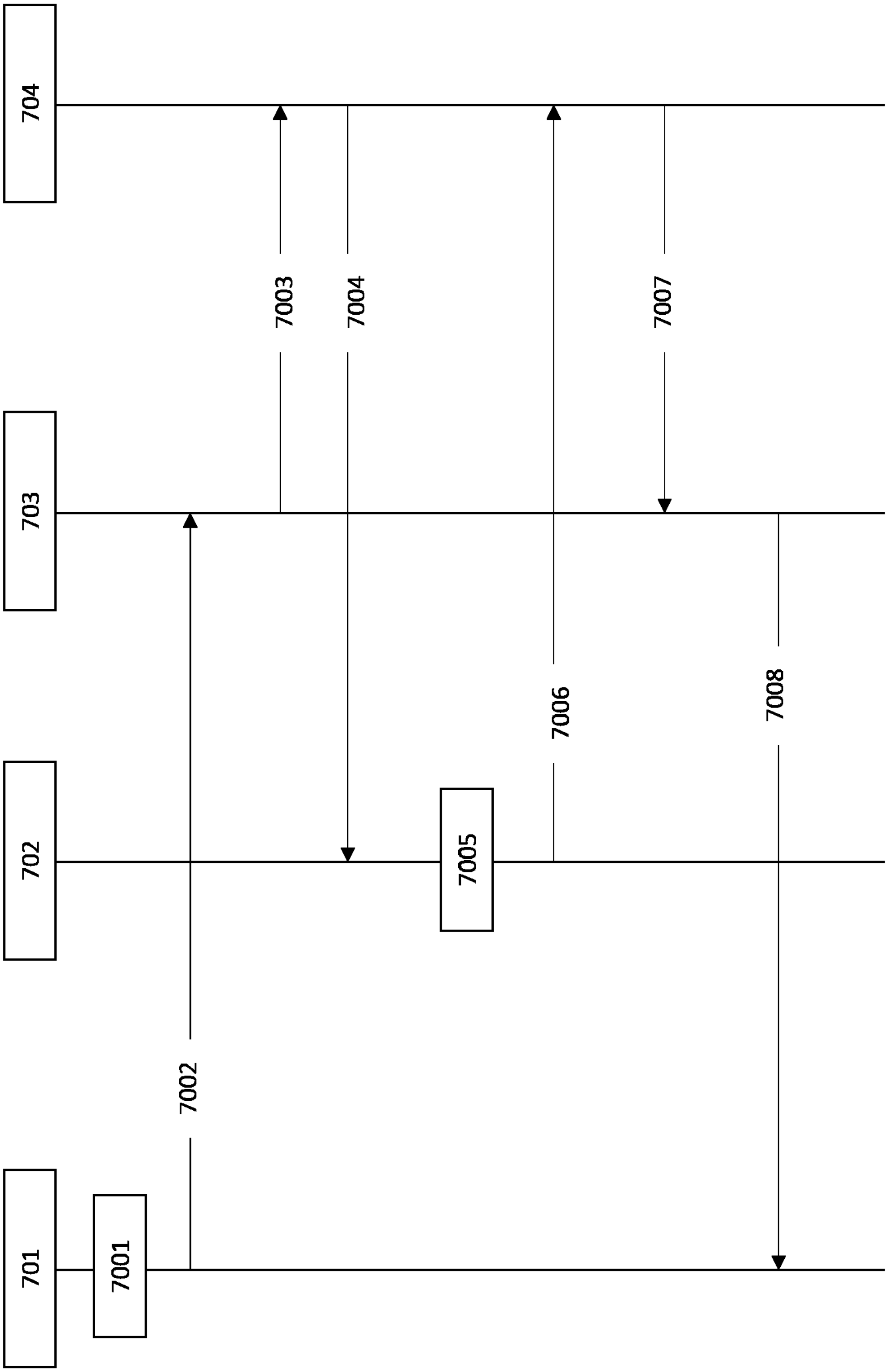
FIG. 7 is an example signalling diagram.

Another example signalling flow illustrating the presently described techniques is provided in FIG. 7, in which the coverage cell is provided by an eNB 701 in LTE, and the capacity booster cell is provided by a New Radio cell 702. Also shown in this signalling diagram is the Mobility Management Entity (MME) 703 and the Access and Mobility Function 704.

At 7001, the eNB 701 determines that one or more New Radio-Radio Access Network (NR-RAN) cells of a Next Generation-Radio Access Network (NG-RAN) node 702 acting as booster node can be allowed entering energy saving.

At 7002, the eNB 701 sends a message to the MME 703 for transferring RAN configuration information from the eNB 701 to the MME 703. Using current terminology in 3GPP specifications, this may be transferred using an "eNB Configuration Transfer message" supporting a new information element (IE) "LTE-5G-SONConfigurationTransfer". This new information element may specify that the transfer type is "request" and Self Organizing Network information type "energy saving" to the MME 703. This message may further comprise a cell list of the cells that are allowed to enter energy saving. This cell list may be especially useful when the aim is to deactivate at least part of a capacity booster cell's coverage.

At 7003, the MME 703 receiving the message checks a source and target identifier in the message transmitted at 7002 and forwards the received message to the Access and Mobility Function 704 responsible for the identified target NG-RAN node 702.

These source and target identifiers may be coded according the definitions of the source or target systems, respectively. These source and target identifiers may comprise global node identifiers (for example, a node identifier in combination with a Public Land Mobile Network-Identity and a Tracking Area Identity). With this information, routing of the message content from the MME 703 responsible for the eNB 701 through the core networks (both Enhanced Packet Core and the 5G Core), to the AMF 704 responsible for the target NG-RAN node 702 may be performed. This routing may be performed, for example, using inter-network signalling messages between the different types of networks defined by interoperability standards.

At 7004, the AMF 704 sends the transferred self-organizing network information to the target NG-RAN node 702. This may be performed by comprising the information in, for example, the "Downlink RAN Configuration Transfer" message.

At 7005, the NG-RAN node 702 receiving the message of 7004 determines which of the proposed cells of the cells allowed for energy saving it will let enter energy saving.

At 7006, the NG-RAN node 702 informs the requesting system that cells of the NG-RAN node 702 are going to enter energy saving. This may be performed using, for example, the currently defined "Uplink RAN Configuration Transfer" message. This message may comprise a new information element, labelled herein "LTE-5G-SONConfigurationTransfer" of transfer type "reply" and self-organizing network information type "energy saving" to the MME 702. This message may further comprise a cell list of the cells of the NG-RAN node 702 that are going to be entering energy saving mode/a deactivated state. The source and target identifiers mentioned in 7003 may be used for the message but switch their roles, i.e. received source information will be used as sent target and vice versa.

At 7007 and 7008, the core networks route the message of 7006 back to the requesting node 701 in the source system. This may be effected, for example, by the eNB 701 receiving the replied information as part of another message from the MME 702. For example, the replied information may be provided to eNB 701 with the message "MME Configuration Transfer" sent by the MME 702.

In the above described example, the same messages can be used for the cases where beams and cells are being requested to stay active. For example, the messages may comprise a request cell list of cells to stay active (even if energy saving conditions for deactivation are fulfilled) and a corresponding reply cell list may comprise a list of cells staying active. When finer granularity is needed, e.g. beam level, then the structure of cell list may be enhanced. For example, each cell in the cell list may be associated with (and comprise) a beam list with the beams allowed to enter energy saving or beams to stay active, etc.

Figure 8:
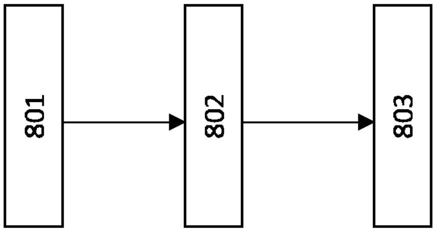
FIGS. 8 to 10 are flow charts illustrating example operations that may be performed by example apparatuses.
Figure 9:
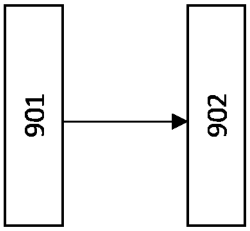
Figure 10:
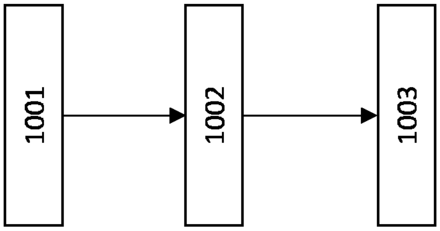

FIGS. 8 to 10 are flow charts illustrating potential operations that may be performed by apparatuses performing aspects of the above-described mechanisms.

FIG. 8 shows example operations that may be performed by an apparatus for an access point configured to provide a first coverage area. The first coverage area may be an LTE cell.

At 801, the apparatus determines to deactivate or activate at least part of a second coverage area located within the first coverage area, the second coverage area being provided by a booster cell. The first coverage area may be provided using a different communication protocol to the communication protocol used to provide the second coverage area.

The determining to deactivate or activate at least part of a second coverage area may be performed in dependence on a plurality of communication parameters for a user equipment located in said second coverage area, the plurality of communication parameters for a user equipment comprising at least two of: user equipment capability information associated with the user equipment; slice information for at least one service being provided to or requested by the user equipment; mobility information of said user equipment; Key Performance Indicators on at least one communication performed by said user equipment in the first coverage area; and/or on at least one communication performed by said user equipment in the first coverage area.

The determining to deactivate or activate a second coverage area located within the first coverage area may depend on a load on the access point and/or a load on neighbouring access points.

The second coverage area may be smaller than the first coverage area. The second coverage area may be a New Radio cell.

At 802, the apparatus identifies said booster cell.

The identifying said at least one booster cell may comprise retrieving a cell booster table from a table host, said cell booster table associating a plurality of coverage areas located in the first coverage area with respective booster cells; and identifying said at least one booster cell using the cell booster table.

At 803, the apparatus transmits a request to said booster cell to deactivate and/or activate the at least part of the second coverage area in dependence on said determination, wherein said request identifies whether the activation and/or deactivation is to be provided at a beam-level or at a cell-level of the second coverage area. The request may be an instruction. The request may be an indication. The request may form part of a negotiation.

The apparatus may receive from said booster cell an indication that different beams will be activated and/or deactivated relative to beams identified in the transmitted request. In response to this indication, the apparatus may determine to deactivate or activate a different part of the second coverage area located within the first coverage area to the at least part of the second coverage area. The apparatus may transmit a request to said booster cell to deactivate and/or activate the different part of the second coverage area. This request may identify whether the activation and/or deactivation is to be provided at a beam-level or at a cell-level of the second coverage area.

The apparatus may maintain at least one list of booster cells, the at least one list comprising: a list of booster cells that are active in the first coverage area, a list of booster cells that must remain active in the first coverage area, and/or a list of booster cells that need to be activated given predefined respective criteria. This/these maintained list(s) may be used to determine to deactivate or deactivate the different part of the second area mentioned in the preceding paragraph. The maintaining may comprise storing the list(s). The maintaining may comprise updating the list(s).

FIG. 9 is a flow chart illustrating potential operations of an apparatus for an access point. This access point may interact with the apparatus of FIG. 8.

At 901, while the access point is located in a first coverage area, the apparatus receive a first request to activate and/or deactivate at least part of a second coverage area provided by the access point, wherein said request identifies whether the activation and/or deactivation is to be provided at a beam-level or at a cell-level of the second coverage area. The request may be an instruction. The request may be an indication. The request may form part of a negotiation.

The first coverage area may be provided using a different communication protocol to the communication protocol used to provide the second coverage area. For example, the access point may be a New Radio access point. The first coverage may be provided by a Long Term Evolution access point. The first request may be received from the apparatus of FIG. 8.

At 902, the apparatus responds to the first request with an indication of said at least part of the second coverage area that will be activated and/or deactivated.

Said indication may indicate different beams that will be activated and/or deactivated relative to beams identified in the received request.

The apparatus may receive a second request to activate and/or deactivate a different part of the second coverage area relative to the at least part of the second coverage area. The second request may be received in response to said indication of different beams. The second request may identify whether the activation and/or deactivation is to be provided at a beam-level or at a cell-level of the second coverage area.

FIG. 10 is a flow chart illustrating potential operations of an apparatus for a network apparatus. This apparatus may interact with the apparatus of FIG. 8. For example, the apparatus of FIG. 10 may be a Table host.

At 1001, the apparatus maintains a cell booster table, said cell booster table associating a plurality of coverage areas located in a first coverage area with respective booster cells, wherein the first coverage area is provided by a first access point. The maintaining may comprise storing the cell table. The maintaining may comprise updating the cell booster table. The first access point may be the access point performing the operations of FIG. 8. The first coverage area may be an LTE cell.

At 1002, the apparatus receives a request for cell booster table from the first access point.

At 1003, the apparatus provides the cell booster table to the first access point in response to said request.

The apparatus may maintain at least one list of booster cells, the at least one list comprising: a list of booster cells that are active in the first coverage area, a list of booster cells that must remain active in the first coverage area, and/or a list of booster cells that need to be activated given predefined respective criteria. The maintaining may comprise storing the list(s). The maintaining may comprise updating the list(s). It is noted that the presently described indications are only a small selection of the possible design options available for this indication. In each case, however, for greatest efficiency the indication may be provided as new information elements in existing message structures (and/or have a similar-enough form to existing message structures) such that it can be sent in the same time-and/or-frequency resource as those existing message structures and/or in the same physical layer channel/structure as the existing message structure. The use of an existing message structure is more efficient as the indication receiving entity can monitor one time-and/or-frequency occasion to derive both if an indication has been sent by a another apparatus as well as if the existing message has been received.

Figure 2:
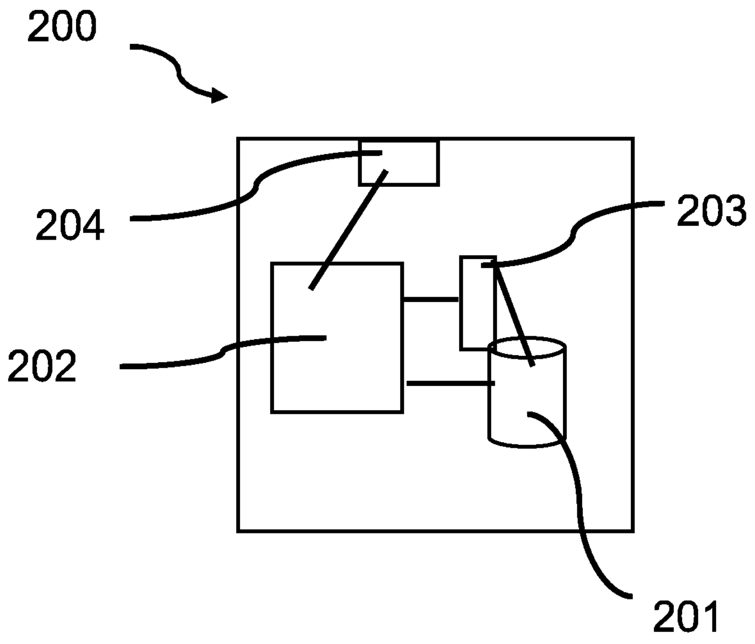
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR etc. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example the control apparatus 200 or processor 201 can be configured to execute an appropriate software code to provide the control functions.

Figure 3:
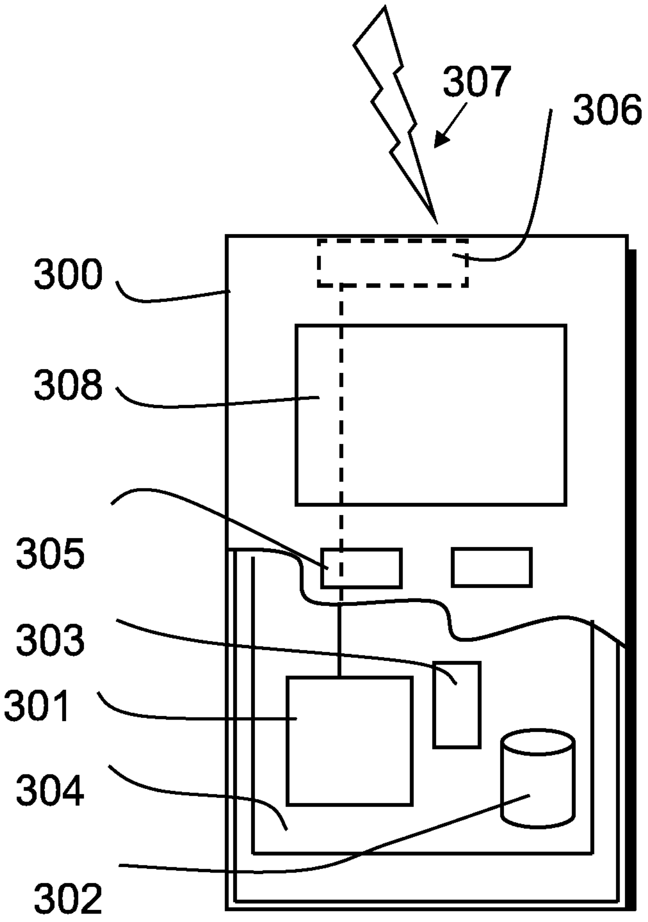
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 704. The user may control the operation of the wireless device by means of a suitable user interface such as key pad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
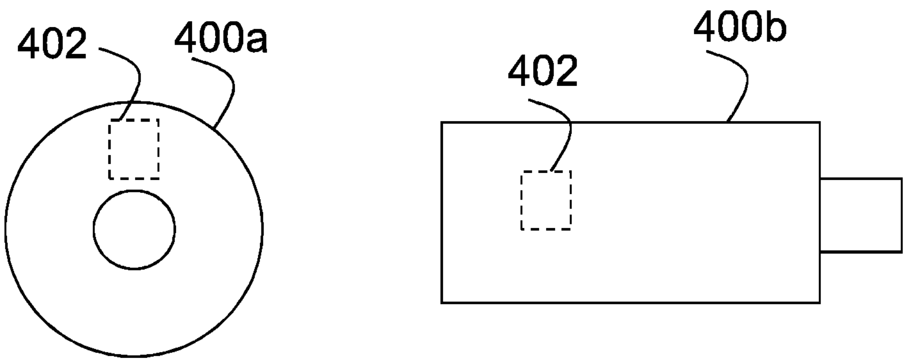
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400*a* (e.g. computer disc (CD) or digital versatile disc (DVD)) and 400*b* (e.g. universal serial bus (USB) memory stick) storing instructions and/or parameters 402 which when executed by a processor allow the processor to perform one or more of the steps of the methods of FIG. 8 and/or FIG. 9 and/or FIG. 10.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG. 8 and/or FIG. 9 and/or FIG. 10, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (AStudy ItemC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An access point configured to provide a first coverage area, the access point comprising:

at least one processor; and at least one memory storing instructions that, when executed by the at least one processor, cause the access point at least to:

determine whether to deactivate or activate at least part of a second coverage area located within the first coverage area, the second coverage area being provided by a booster cell;

identify said booster cell; and transmit a request to said booster cell to deactivate and/or activate the at least part of the second coverage area in dependence on said determination, wherein said request identifies whether the activation and/or deactivation is to be provided at a beam-level or at a cell-level of the second coverage area.

2. The access point as claimed in claim 1, wherein the first coverage area is provided using a different communication protocol to the communication protocol used to provide the second coverage area.

3. The access point as claimed in claim 1, wherein identifying said booster cell comprises;

retrieving a cell booster table from a table host, said cell booster table associating a plurality of coverage areas located in the first coverage area with respective booster cells; and identifying said at least we booster cell using the cell booster table.

4. The access point as claimed in claim 3, wherein the determining to deactivate or activate at least part of a second coverage area is performed in dependence on a plurality of communication parameters for a user equipment located in said second coverage area, the plurality of communication parameters for a user equipment comprising at least two of: user equipment capability information associated with the user equipment; slice information for at least one service being provided to or requested by the user equipment; mobility information of said user equipment; Key Performance Indicators on at least one communication performed by said user equipment in the first coverage area; or on at least one communication performed by said user equipment in the first coverage area.

5. The access point as claimed in claim 4, wherein the determining whether to deactivate or activate a second coverage area located within the first coverage area depends on a load on the access point and/or a load on neighbouring access points.

6. The access point as claimed in claim 5, wherein the instructions, when executed on the at least one processor further cause the access point to:

receive from said booster cell an indication that different beams will be activated and/or deactivated relative to beams identified in the transmitted request;

determine to deactivate or activate a different part of the second coverage area located within the first coverage area to the at least part of the second coverage area; and transmit a request to said booster cell to deactivate and/or activate the different part of the second coverage area.

7. The access point as claimed in claim 6, wherein the instructions, when executed on the at least one processor further cause the access point to:

maintain at least one list of booster cells, the at least one list comprising: a list of booster cells that are active in the first coverage area, a list of booster cells that must remain active in the first coverage area, and/or a list of booster cells that need to be activated given predefined respective criteria.

8. The access point as claimed in claim 1, wherein said request identifies that the activation and/or deactivation is to be provided at the beam-level.

9. The access point as claimed in claim 8, wherein said request identifies beams of said booster cell to be activated and/or deactivated.

10. An access point comprising:

at least one processor; and at least one memory storing instructions that, when executed by the at least one processor, cause the access point at least to:

while the access point is located in a first coverage area, receive a first request to activate and/or deactivate at least part of a second coverage area provided by the access point, wherein said request identifies whether the activation and/or deactivation is to be provided at a beam-level or at a cell-level of the second coverage area; and respond to the first request with an indication of said at least part of the second coverage area that will be activated and/or deactivated.

11. The access point as claimed in claim 10, wherein the first coverage area is provided using a different communication protocol to the communication protocol used to provide the second coverage area.

12. The access point as claimed in claim 11, wherein said indication indicates different beams that will be activated and/or deactivated relative to beams identified in the received request.

13. The access point as claimed in claim 12, wherein the instructions, when executed on the at least one processor further cause the access point to receive a second request to activate and/or deactivate a different part of the second coverage area relative to the at least part of the second coverage area.

14. The access point as claimed in claim 10, wherein said request identifies that the activation and/or deactivation is to be provided at the beam-level.

15. The access point as claimed in claim 14, wherein said request identifies beams of said booster cell to be activated and/or deactivated.

16. A network apparatus comprising:

at least one processor; and at least one memory storing instructions that, when executed by the at least one processor, cause the network apparatus at least to:

maintain a cell booster table, said cell booster table associating a plurality of coverage areas located in a first coverage area with respective booster cells, wherein the first coverage area is provided by a first access point;

receive a request for the cell booster table from the first access point; and provide the cell booster table to the first access point in response to said request.

17. The network apparatus as claimed in claim 16, wherein the instructions, when executed on the at least one processor further cause the network apparatus to maintain at least one list of booster cells, the at least one list comprising: a list of booster cells that are active in the first coverage area, a list of booster cells that must remain active in the first coverage area, and/or a list of booster cells that need to be activated given predefined respective criteria.

18. A method for for an access point configured to provide a first coverage area, the method comprising:

determining to deactivate or activate at least part of a second coverage area located within the first coverage area, the second coverage area being provided by a booster cell;

identifying said booster cell; and transmitting a request to said booster cell to deactivate and/or activate the at least part of the second coverage area in dependence on said determination, wherein said request identifies whether the activation and/or deactivation is to be provided at a beam-level or at a cell-level of the second coverage area.

19. The method as claimed in claim 18, wherein said request identifies that the activation and/or deactivation is to be provided at the beam-level.

20. The method as claimed in claim 19, wherein said request identifies beams of said booster cell to be activated and/or deactivated.

* * * * *